United States Patent
Schumacher et al.

(10) Patent No.: US 7,156,452 B2
(45) Date of Patent: Jan. 2, 2007

(54) HOOD SHIELD

(75) Inventors: Christopher R. Schumacher, Frederick, CO (US); Phil Ness, Longmont, CO (US)

(73) Assignee: Lund International, Inc., Anoka, MN (US)

( * ) Notice: Subject to any disclaimer, the term of this patent is extended or adjusted under 35 U.S.C. 154(b) by 69 days.

(21) Appl. No.: 10/985,347

(22) Filed: Nov. 9, 2004

(65) Prior Publication Data

US 2006/0097547 A1    May 11, 2006

(51) Int. Cl.
   *B60R 13/04* (2006.01)
(52) U.S. Cl. .............................. 296/180.1; 296/180.2; 296/91; 296/95.1
(58) Field of Classification Search ............. 296/180.1, 296/180.2, 95.1, 91, 96.11, 78.1, 77.1, 97.7; 180/69.1

See application file for complete search history.

(56) References Cited

U.S. PATENT DOCUMENTS

| | | | |
|---|---|---|---|
| 2,034,493 A | 3/1936 | Sonnenberg | |
| 2,793,705 A | 5/1957 | Garrity | |
| 2,823,072 A | 2/1958 | Podolan | |
| 3,015,517 A | 1/1962 | Thornburgh | |
| 3,022,848 A | 2/1962 | Heiser | |
| 3,815,700 A | 6/1974 | Mittendorf | |
| 3,831,696 A | 8/1974 | Mittendorf et al. | |
| 4,052,099 A | 10/1977 | Lowery et al. | |
| 4,153,129 A | 5/1979 | Redmond | |
| 4,219,218 A | 8/1980 | Waldon | |
| 4,262,954 A * | 4/1981 | Thompson | 296/91 |
| 4,376,546 A | 3/1983 | Guccione et al. | |
| D284,847 S | 7/1986 | Smith | |
| 4,621,860 A | 11/1986 | Gerst | |
| D300,918 S | 5/1989 | Turner | |
| 4,842,319 A * | 6/1989 | Ziegler et al. | 296/91 |
| 4,878,707 A | 11/1989 | Meyers | |
| 4,883,139 A | 11/1989 | Gross | |
| 4,883,303 A | 11/1989 | Gross | |
| 4,929,013 A | 5/1990 | Eke | |
| 4,952,006 A | 8/1990 | Willey | |
| 4,953,909 A | 9/1990 | Crane | |
| 5,018,782 A | 5/1991 | Fiegel et al. | |
| 5,112,095 A * | 5/1992 | Lund et al. | 296/91 |
| D328,274 S | 7/1992 | Lund | |
| D329,630 S | 9/1992 | Lund et al. | |

(Continued)

FOREIGN PATENT DOCUMENTS

GB       1375886       11/1974

OTHER PUBLICATIONS

Search results for "http://www.realtruck.com/" from the Internet Archive WayBackMachine showing an EGR SuperGuard Skull Hood Shield attached to a Ford truck, 9 pages, available online as of Sep. 23, 2004.

(Continued)

*Primary Examiner*—D. Glenn Dayoan
*Assistant Examiner*—Greg Blankenship
(74) *Attorney, Agent, or Firm*—Merchant & Gould, P.C.

(57) ABSTRACT

A vehicle shield is provided according to the invention. The vehicle shield is constructed to avoid excessive hood flutter. The shield includes a hood protector region and an attachment region. The hood protector region is constructed for extending across at least a portion of a vehicle hood for protecting the vehicle hood. The attachment region is constructed for attaching the hood protector region to a vehicle. Also provided is a method of installing the shield to a motor vehicle.

14 Claims, 3 Drawing Sheets

U.S. PATENT DOCUMENTS

| | | | |
|---|---|---|---|
| 5,338,088 A | | 8/1994 | Stanesic |
| 5,348,363 A | * | 9/1994 | Fink ............................ 296/91 |
| D355,399 S | | 2/1995 | Lund |
| 5,403,059 A | * | 4/1995 | Turner ......................... 296/91 |
| 5,454,619 A | | 10/1995 | Haraway, Jr. |
| 5,544,931 A | | 8/1996 | Nelson |
| 5,707,097 A | * | 1/1998 | Horwill ....................... 296/91 |
| 5,755,483 A | * | 5/1998 | Lund ........................... 296/91 |
| 5,820,201 A | * | 10/1998 | Jabalee .................. 296/136.02 |
| 5,872,656 A | * | 2/1999 | Horwill et al. ............. 359/601 |
| 5,924,756 A | * | 7/1999 | Homa ......................... 296/91 |
| 6,027,156 A | * | 2/2000 | Lund et al. .................. 296/91 |
| 6,547,306 B1 | * | 4/2003 | Espinose et al. .............. 296/91 |
| 6,739,634 B1 | * | 5/2004 | Pagan ........................ 293/117 |
| 6,752,446 B1 | | 6/2004 | Espinose et al. |

OTHER PUBLICATIONS

Search results for "http://www.jcwhotney.com/" from the Internet Archive WyBackMachine showing EGR Collegiate Hood Shields, which include tab members that extend away from the shield portion and are positioned between the hood and the grille when the hood shield is attached to the Ford truck, 9 pages, available online as of Nov. 3, 2004.

* cited by examiner

HOOD SHIELD

FIELD OF THE INVENTION

The invention relates to a vehicle hood shield for mounting to the front end of a vehicle.

BACKGROUND OF THE INVENTION

Numerous types of vehicle shields have been developed to protect a vehicle from contact with road debris, bugs, and to deflect airflow away from windshields. These devices are also commonly referred to as bug shields or airflow deflectors. Such devices are described in U.S. Pat. No. 4,929,013 to Eke, U.S. Pat. No. 5,112,095 to Lund et al., U.S. Pat. No. 5,755,483 to Lund, U.S. Pat. No. 6,027,156 to Lund et al., and U.S. Pat. No. 6,752,446 to Espinose et al. All of the above patents are assigned to Lund Industries, Incorporated, the assignee of this patent application.

Changes in the design and manufacturing of vehicle hoods have raised new issues with respect to the construction of vehicle shields. As compared to older model vehicles, the hoods on later model vehicles are generally thinner and lighter. Attaching standard hood shields to later model vehicles can cause the hoods on the later model vehicles to flutter excessively at high speeds. Accordingly, one object of this invention is to provide a hood shield that does not cause an unacceptable amount of hood flutter when the vehicle is driven at a high rate of speed.

SUMMARY OF THE INVENTION

A vehicle shield device is provided according to the invention. The vehicle shield includes a hood protector region and an attachment region. The hood protector region is constructed for extending across at least a portion of a vehicle hood for protecting the vehicle hood. The attachment region is constructed for attaching the hood protector region to a vehicle.

The hood attachment region includes a first hood attachment flange constructed for attaching to a first side of a vehicle hood, a grille engagement flange constructed to be sandwiched between the hood and the grille, and a second attachment flange constructed for attachment to a second side of a vehicle hood. The hood protector region and the hood attachment region are constructed such that when the vehicle shield is attached to a motor vehicle the hood flutter is minimal even when the vehicle is driven at a high rate of speed. Also provided according to the invention is a method for installing a vehicle shield.

DETAILED DESCRIPTION OF THE PREFERRED EMBODIMENT

Figure 1:
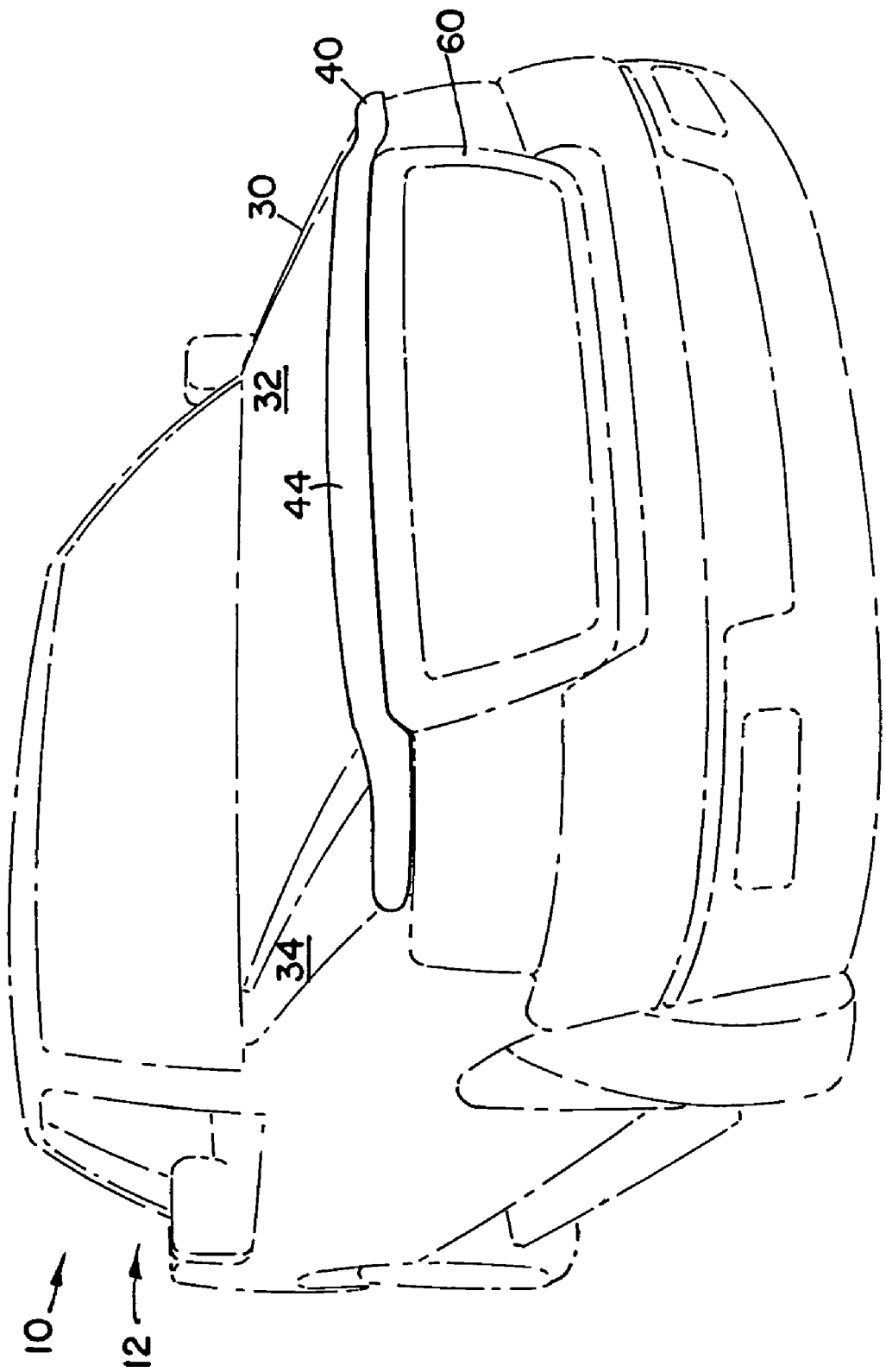
FIG. 1 is a perspective front view of a vehicle shield according to the principles of the invention provided on a motor vehicle.

Referring to FIG. 1, a vehicle shield according to the invention is shown at reference numeral 40 attached to the hood 30 of a motor vehicle 10. The motor vehicle 10 in the depicted embodiment is a 2004 Ford F150 pickup truck 12. The truck 12 includes a grille 60 that is attached to the hood 30 such that when the hood is opened the grille 60 is raised with the hood 30. It should, however, be appreciated that the vehicle shield can be adapted to be attached to vehicles 10 wherein the hood 30 and the grille 60 are not attached.

As addressed in the background, later model vehicles generally feature thinner and lighter hood designs as compared to older model vehicles. For example, the hood 30 on the Ford F150 12 features a double-layered aluminum construction. When the truck 12 is driven at high speeds, such as in excess of 80 miles per hour, the corners 34 and 32 of the hood 30 have a tendency to flutter. When standard shields or deflectors are attached to the truck 12 they impart forces on the hood 30 and influence the air flow around the hood 30 thereby generating an increased level of flutter at the rear corners 34 and 32 of the hood 30. In contrast, installing the shield 40 of the present invention to a truck 12 improves the airflow characteristics around the hood 30 and decreases hood flutter.

Figure 2:
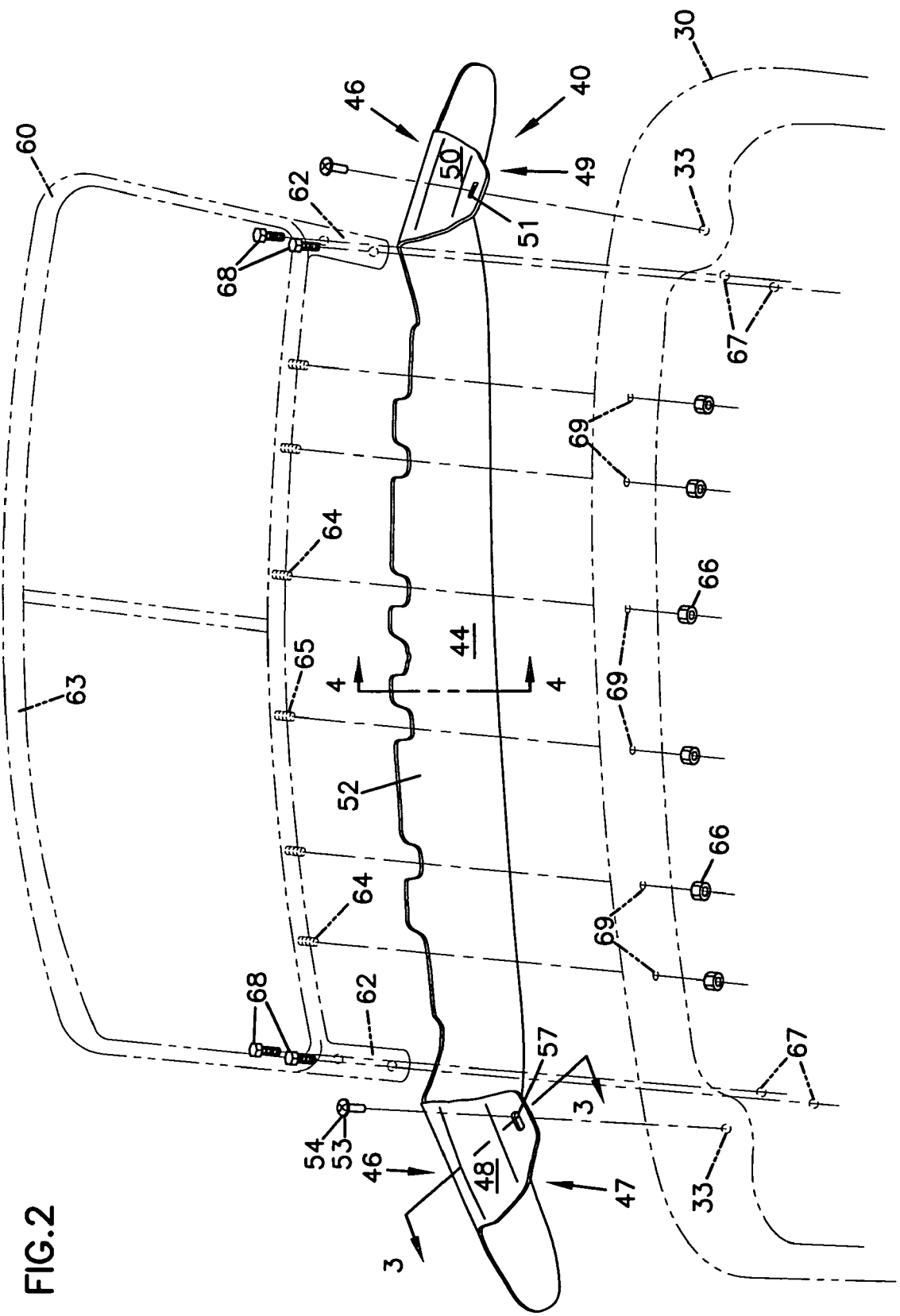
FIG. 2 is an exploded assembly view of the vehicle shield, vehicle hood, and vehicle grille of FIG. 1.

Referring to FIG. 2, the vehicle shield 40 is shown in an exploded assembly view. The shield 40 is shown between the hood 30 (below) and the grille 60 (above). The shield 40 includes a hood protector region 44 and an attachment region 46. The hood protector region 44 protects the hood 30 from, among other things, road debris and bugs. In the embodiment shown, the hood protector region 44 has a length Ls that is greater that the width $W_H$ of the hood 30. As such, the hood protector region 44 protects more than the hood 30 and portions the truck 12 directly behind the hood 30. The majority of the hood protector region 44 remains exposed when the hood 30 of the truck 12 is in a closed position as shown in FIG. 1.

Still referring to FIG. 2, the hood attachment region 46 includes portions of the shield 40 that are used to attach the shield 40 to the truck 12. The hood attachment region 46 shown in FIG. 2 includes the first hood attachment flange 48, second hood attachment flange 50, and grille engagement flange 52. The above listed flanges 48, 50, and 52 are shown separated from each other by portions of the hood protector region 44. Nevertheless, it should be appreciated that even though the hood attachment region 46 in the depicted embodiment is not contiguous, the hood attachment region 46 in alternative embodiments may be contiguous. In addition, though the hood protector region 44 and the hood attachment region 46 are shown as being formed of a single continuous sheet of material, in alternative embodiments the hood protector region 44 and the hood attachment region 46 can comprise separate and distinct structural members that are attached to each other via fasteners or other means. In the embodiment shown, the majority of the hood attachment region is hidden from view when the hood 30 is in the closed position as shown in FIG. 1.

A plurality of grille engagement flanges 52 are shown extending from the hood protector region 44. The grille engagement flanges 52 are constructed to be sandwiched between the hood 30 and the grille 60. Installing the shield 40 includes the step of separating the grille 60 from the hood 30. During installation, brackets 62 can be loosen or completely removed from the bracket receiving location 67 on the underside 39 of the hood 30. Once the grille engagement flanges 52 have been positioned, the grille 60 can be re-secured to the hood 30 by tightening or reattaching the fasteners 68 of the brackets 62 and also the grille fasteners 64. It should also be appreciated that the hood shield 40 could be installed during the initial assembly of the vehicle 10.

In the embodiment shown, the shield 40 includes six tabs that are spaced apart to allow grille fasteners 64 shown as bolts 65 to pass between engagement flanges 52 and through apertures 69 in the hood 30 for engagement with nuts 66 at the underside 39 of the hood 30. It should be appreciated that many other arrangements of the grille engagement flanges 52 are possible. For example, the grille engagement flange 52 could be a single large flange with apertures therein to allow the grille fasteners 64 to pass through to engage nuts 66 at the underside 39 of the hood 30.

The first hood attachment flange 48 and the second hood attachment flange 50 are shown near the ends of the shield 40 in the first end portion 47 and second end portion 49, respectively. The first and second hood attachment flanges 48 and 50 are mirror images of each other. Therefore, for simplicity, the description regarding the attachment flanges 48 and 50 references only the first flange 48.

The attachment flange 48 is constructed to extend from the hood protector region 44. During installation of the shield 40, aperture 51 in the first hood attachment flange 48 is aligned with an aperture 33 in the underside 39 of the hood 30. The aperture 51 is shown to be a slot to provide for some lateral adjustment of the shield 40 relative to the truck 12. Laterally adjusting the shield 40 may be necessary due to manufacturing tolerances associated with the truck 12 and also the shield 40. Once the apertures 51 and 33 are aligned, a fastener 54 (shown as a pushpin 53) is manually inserted through both apertures. When the pushpin 53 is inserted into the apertures 51 and 33, the pushpin 53 expands and secures the first hood attachment flange 48 to the underside 39 of the hood 30. The use of the pushpins 53 is preferred since it allows the step of attaching the hood attachment flange 48 to be accomplished without using tools. Nonetheless, it should be appreciated that the use of many alternative fasteners 54 are possible. For example, the fasteners 54 could also be ordinary sheet metal screws.

Figure 3:
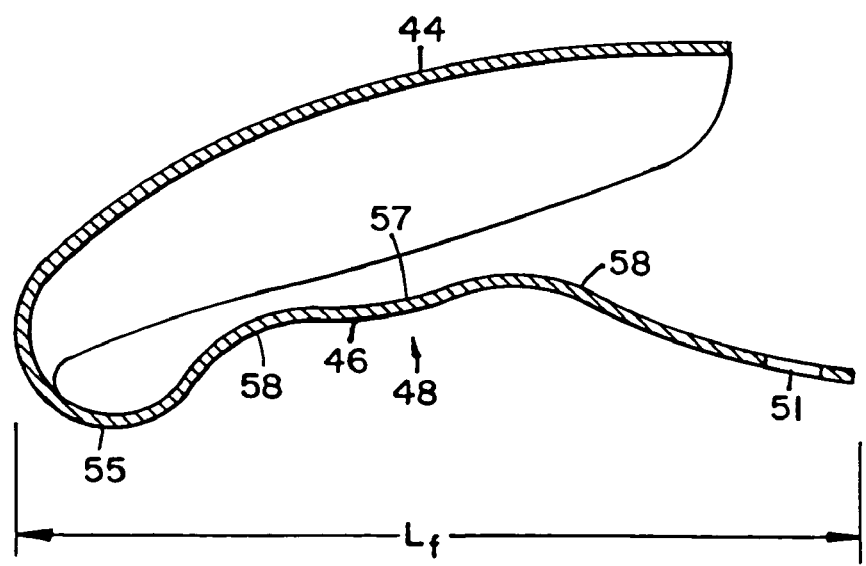
FIG. 3 is a cross-sectional view of the vehicle shield along 3—3 of FIG. 2.

FIG. 3 is a cross-section of the first hood attachment flange 48 along line 3—3. As shown, the hood attachment flange 48 is contoured. The flange 48 includes a number of bends 55, 56, 57, and 58. These bends, otherwise referred to as contours or ridges, are for clearance in that they are sized and configured to prevent the first hood attachment flange 48 from interfering with or otherwise hindering the closing of the hood. In addition, the bends 55, 56, 57, and 58 improve the stiffness of the flange to prevent excessive deflection thereof.

Figure 4:
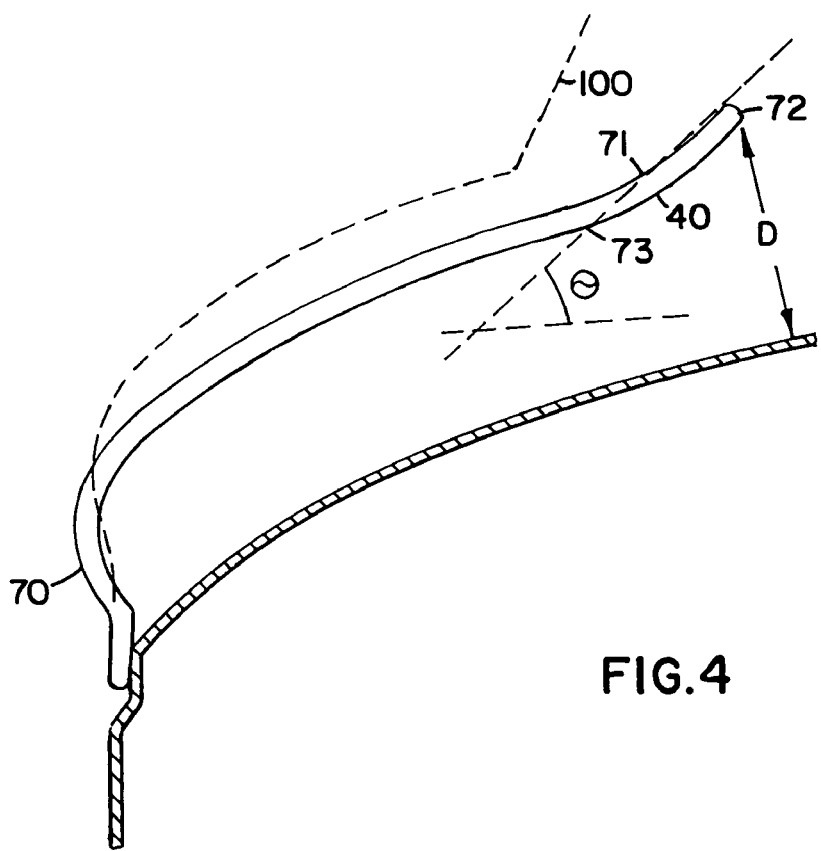
FIG. 4 is a cross-sectional view of the vehicle shield along 4—4 of FIG. 2.

FIG. 4 is a cross-section of the shield 40 attached to a truck 12 along the line 4—4. Also in FIG. 4 for comparison purposes is the profile of prior art hood shield 100. As compared to the shield 100 of the prior art, the shield 40 of the present invention is lower profiled and more "pulled back." The construction of the shield 40 improves the airflow characteristics around the rear corners 32 and 34 of the hood 30 and also decreases the distortion forces imposed on the hood 30 by the shield 40.

The shield 40 includes a leading surface 70 which is the surface of the shield 40 that first contacts the air that is deflected by the shield 40 while the truck 12 is in forward motion. Since the end portions 47 and 49 of the shield 40 are bent backwards conforming to the curvature of the front end of the truck 12, the leading surface 70 is located at the center or middle of the shield 40. Conversely, the trailing surface 71 is the surface of the shield 40 that contacts the deflected air immediately before the air completely passes over the shield 40 when the truck 12 is moving forward. A trailing edge 72 is the periphery edge of the hood protector region 44 nearest the back of the truck 12. Unlike the trailing surface 71, the trailing edge spans the entire length of the shield 40. A portion of the trailing edge 72 defines the rear boundary of the trailing surface 71.

In the embodiment shown, the trailing surface 71 is within 1½ inches away from the hood 30 when the shield 40 is installed and the truck 12 is stationary. Most preferably, the trailing surface 71 is positioned 1⅛ inches from the hood 30. The above measurement is taken at the direction that defines the shortest distance between the trailing surface 71 and the hood 30 (referenced in FIG. 4 as "D"). It should be understood that the distance between the trailing edge 72 and the hood 30 may vary depending on where along the shield 40 the measurement is taken. In the embodiment shown, the shield 40 is contoured to follow the contours of the truck 12 in that the end portions 47 and 49 drop lower to match the down left and right sides of the hood 30. FIG. 4 also shows a tangent line 73 to the trailing surface 71. Preferably, the tangent line 73 defines an angle $\theta$ less than or equal to 30 degrees. The angle is measured relative to a horizontal plane relative to the truck 12. Most preferably, the tangent line 73 defines an angle $\theta$ less than or equal to 20 degrees from the horizontal reference plane.

The shield 40 is preferably manufactured from a sheet comprising a polymer composition. The polymer composition that can be used according to the invention preferably includes a polymer that provides the desired degree of flexibility and rigidity so that the shield can minimize the forces that cause hood flutter while defecting air and road debris from the hood 30 of the truck 12 A preferred plastic material is one that provides vehicle shield 40 that functions well under conditions of use. An exemplary plastic material that can be used includes polycarbonate polymer and mixtures of polycarbonate polymer with other polymers. Preferably, the shield 40 is manufactured using a match mold thermoformed process. The plastic sheet preferably has a thickness that provides the vehicle shield with sufficient rigidity to withstand the wind pressures caused by being placed on the hood of a motor vehicle and will resist fluttering. The plastic sheet preferably has a thickness of between about 2 to 3 millimeters.

The above specification, examples and data provide a complete description of the manufacture and use of the composition of the invention. Since many embodiments of the invention can be made without departing from the spirit and scope of the invention, the invention resides in the claims hereinafter appended.

We claim:

1. A vehicle shield for use on a motor vehicle having a grille attached to a vehicle hood, the vehicle shield comprising:
   a hood protector region constructed for extending across at least a portion of the vehicle hood for protecting the vehicle hood, the hood protector region comprising:
      an airflow deflector having a leading surface and a trailing surface, wherein at maximum the trailing surface extends less than about 1½ inches from the vehicle hood when the vehicle shield is installed on the motor vehicle;
   a hood attachment region constructed for attaching the hood protector region to the vehicle hood, the hood attachment region comprising:

a first hood attachment flange extending from a first end of the hood protector region and constructed for attaching to a first side of the vehicle hood;

a second hood attachment flange extending from a second end of the hood protector region and constructed for attachment to a second side of the vehicle hood; and a plurality of grille engagement flanges extending from the hood attachment region and provided between the first hood attachment flange and the second hood attachment flange, and between fasteners provided for holding the vehicle hood and the vehicle grille together.

2. A vehicle shield according to claim 1, wherein the hood protector region and the hood attachment region comprise a continuous plastic sheet.

3. A vehicle shield according to claim 2, wherein the plastic sheet comprises a polycarbonate composition.

4. A vehicle shield according to claim 2, wherein the plastic sheet has a thickness of about 2 to about 3 millimeters.

5. A vehicle shield according to claim 1, wherein the hood protector region comprises a length that is greater than a width of the vehicle hood.

6. A vehicle shield according to claim 1, wherein the trailing edge is disposed at least 1 inch away from the vehicle hood when installed.

7. A vehicle shield according to claim 1, wherein the first and second hood attachment flanges each include a portion that is attached to the underside of the vehicle hood.

8. A vehicle shield according to claim 7, wherein the first and second hood attachment flanges include apertures that are arranged to be aligned with apertures in a bottom surface of a hood of a pickup truck.

9. A vehicle shield for use on a motor vehicle having a grille attached to a vehicle hood, the vehicle shield comprising:

a hood protector region constructed for extending across at least a portion of the vehicle hood for protecting the vehicle hood, the hood protector region comprising:

an airflow deflector having a leading surface and a wailing surface, wherein the trailing surface is disposed at about a 30 degree angle or less relative to a horizontal plane when the shield is installed on the motor vehicle;

a hood attachment region constructed for attaching the hood protector region to the vehicle hood, the hood attachment region comprising:

a first hood attachment flange extending from a first end of the hood protector region and constructed for attaching to a first side of a vehicle hood;

a second hood attachment flange extending from a second end of the hood protector region and constructed for attachment to a second side of the vehicle hood; and a plurality of grille engagement flanges extending from the hood attachment region and provided between the first hood attachment flange and the second hood attachment flange, and between fasteners provided for holding the vehicle hood and the vehicle grille together.

10. A vehicle shield according to claim 9, wherein the hood protector region and the hood attachment region comprise a continuous plastic sheet.

11. A vehicle shield according to claim 9, wherein the first and second hood attachment flanges each include a portion that attaches to the underside of the vehicle hood.

12. The vehicle shield according to claim 9, wherein the airflow deflector includes a continuous curved cross sectional profile between the leading surface and a trailing surface, wherein the cross sectional profile includes no points of inflection.

13. A method for installing a vehicle shield, the method comprising the steps of:

providing a vehicle including a hood and a grille, wherein the hood is attached to the grille and the hood includes a bottom surface having a hood aperture therein;

providing a shield having a hood protector region and a hood attachment region, wherein the hood attachment region includes a grille engagement flange attached to the hood protector region and an attachment flange including a flange aperture;

separating the grille from the hood;

positioning the shield such that the flange aperture is aligned with the hood aperture;

inserting a fastener though the flange aperture and hood aperture; and securing the grille to the hood such that a portion of the engagement flange is between the hood and the grille.

14. The method according to claim 13, wherein the step of inserting fasteners through the flange aperture and the hood aperture includes manually pushing a pushpin through the aligned apertures.

* * * * *

UNITED STATES PATENT AND TRADEMARK OFFICE
CERTIFICATE OF CORRECTION

PATENT NO. : 7,156,452 B2
APPLICATION NO. : 10/985347
DATED : January 2, 2007
INVENTOR(S) : Schumacher et al.

It is certified that error appears in the above-identified patent and that said Letters Patent is hereby corrected as shown below:

On the title page item (56), line 1,
    Page 2, References Cited, Other Publications: "for "http://www.jcwhotney.com/" from" should read --for "http://www.jcwhitney.com/" from--

Col. 5, line 42, claim 9: "wailing surface," should read --trailing surface,--

Signed and Sealed this

Seventeenth Day of April, 2007

JON W. DUDAS
*Director of the United States Patent and Trademark Office*